US012614300B2

(12) United States Patent
Shi et al.

(10) Patent No.: US 12,614,300 B2
(45) Date of Patent: Apr. 28, 2026

(54) CAMERA POSE RELATIVE TO OVERHEAD IMAGE

(71) Applicants: Ford Global Technologies, LLC, Dearborn, MI (US); Australian National University, Canberra (AU)

(72) Inventors: Yujiao Shi, Canberra (AU); Hongdong Li, Lyneham (AU); Ankit Girish Vora, Northville, MI (US); Akhil Perincherry, Dearborn, MI (US)

(73) Assignees: Ford Global Technologies, LLC, Dearborn, MI (US); The Australian National University, Canberra/Act (AU)

( * ) Notice: Subject to any disclaimer, the term of this patent is extended or adjusted under 35 U.S.C. 154(b) by 354 days.

(21) Appl. No.: 18/190,194

(22) Filed: Mar. 27, 2023

(65) Prior Publication Data
US 2024/0331187 A1 Oct. 3, 2024

(51) Int. Cl.
*G06T 7/70* (2017.01)
*G06V 10/74* (2022.01)
(Continued)

(52) U.S. Cl.
CPC .............. *G06T 7/70* (2017.01); *G06V 10/761* (2022.01); *G06V 10/771* (2022.01); *G06T 2207/30244* (2013.01)

(58) Field of Classification Search
CPC ... G06T 7/70; G06T 2207/30244; G06T 7/73; G06T 7/74; G06T 3/60; G06T 7/60;
(Continued)

(56) References Cited

U.S. PATENT DOCUMENTS 9,251,434 B2 2/2016 Cao et al.
9,501,699 B2 11/2016 Kim et al.
(Continued)

FOREIGN PATENT DOCUMENTS

CN 113223065 A 8/2021
CN 114170304 A * 3/2022 ............. G06N 3/045
(Continued)

OTHER PUBLICATIONS

Wang, S., Zhang, Y., Vora, A., Perincherry, A. and Li, H., 2022. Satellite Image Based Cross-view Localization for Autonomous Vehicle. arXiv e-prints, pp. arXiv-2207. (Year: 2022).*
(Continued)

*Primary Examiner* — Chineyere Wills-Burns
*Assistant Examiner* — Emmanuel Silva-Avina
(74) *Attorney, Agent, or Firm* — Frank A. MacKenzie; Brooks Kushman P.C.

(57) ABSTRACT

A computer includes a processor and a memory, and the memory stores instructions executable by the processor to generate an observed overhead feature map from an overhead image of a geographic area; generate a ground-view feature map from a ground-view image captured by a camera within the geographic area, the camera oriented at least partially horizontally while capturing the ground-view image; project the ground-view feature map to an overhead view based on a geometric relationship, resulting in a projected overhead feature map; determine a rotation of the camera relative to the overhead image based on the projected overhead feature map and the observed overhead feature map; and determine a translation of the camera relative to the overhead image based on the projected overhead feature map and the observed overhead feature map.

20 Claims, 6 Drawing Sheets

(51) Int. Cl.
 *G06V 10/77* (2022.01)
 *G06V 10/771* (2022.01)
(58) Field of Classification Search
 CPC . G06T 2207/10004; G06T 2207/10032; G06T
 2207/20081; G06T 2207/20084; G06T
 2207/30252; G06V 10/761; G06V
 10/771; G06V 20/56; G01C 21/30
 USPC ......................................................... 382/103
 See application file for complete search history.

(56) References Cited

U.S. PATENT DOCUMENTS

| | | | | |
|---|---|---|---|---|
| 2014/0064624 | A1* | 3/2014 | Kim | G06V 10/757 |
| | | | | 382/201 |
| 2016/0005145 | A1* | 1/2016 | Seitz | G06T 7/33 |
| | | | | 382/154 |
| 2021/0104065 | A1* | 4/2021 | Hasberg | G06N 3/09 |
| 2021/0229291 | A1 | 7/2021 | Yang et al. | |
| 2022/0196432 | A1 | 6/2022 | Buda et al. | |
| 2022/0230353 | A1* | 7/2022 | Lee | G06T 7/73 |

FOREIGN PATENT DOCUMENTS

| | | | |
|---|---|---|---|
| CN | 114549871 | A | 5/2022 |
| CN | 115293976 | A | 11/2022 |

OTHER PUBLICATIONS

Kim et al., "Satellite Image-based Localization via Learned Embeddings", 2017 IEEE International Conference on Robotics and Automation (ICRA) Singapore, May 29-Jun. 3, 2017.

Shetty et al., "UAV Pose Estimation using Cross-view Geolocalization with Satellite Imagery", 2019 International Conference on Robotics and Automation (ICRA) Palais des congres de Montreal, Montreal, Canada, May 20-24, 2019.

Wang et al., "Satellite Image Based Cross-view Localization for Autonomous Vehicle", arXiv:2207.13506v1 [cs.CV] Jul. 27, 2022.

Dong et al., "Self-Supervised Representation Learning for Remote Sensing Image Change Detection Based on Temporal Prediction", https://www.mdpi.com/journal/remotesensing, Received: May 9, 2020; Accepted: Jun. 3, 2020; Published: Jun. 9, 2020.

Non-Final Office Action dated Dec. 3, 2025 re U.S. Appl. No. 18/468,981 filed Sep. 18, 2023.

Shi et al., "Beyond Cross-view Image Retrieval:Highly Accurate Vehicle Localization Using Satellite Image", In Proceedings of the IEEE/CVF Conference on Computer Vision and Pattern Recognition (pp. 17010-17020). (Year: 2022) (11 pages).

Shi et al., "Boosting 3-DoF Ground-to-Satellite Camera Localization Accuracy via Geometry-Guided Cross-View Transformer", arxiv preprint arxiv:2307.08015. (Year: 2023( (15 pages).

Zhang et al., "Monocular weakly supervised depth and pose estimation method based on multi-information fusion", Kuwait Journal of Science, 49(3). (Year: 2022) (23 pages).

* cited by examiner

205

300

305

210

300

Neural Optimizer

Spatial Correlation

CAMERA POSE RELATIVE TO OVERHEAD IMAGE

BACKGROUND

Advanced driver assistance systems (ADAS) are electronic technologies that assist drivers in driving and parking functions. Examples of ADAS include forward collision detection, lane-departure detection, blind-spot detection, automatic emergency braking, adaptive cruise control, and lane-keeping assistance systems.

DETAILED DESCRIPTION

Figure 1:
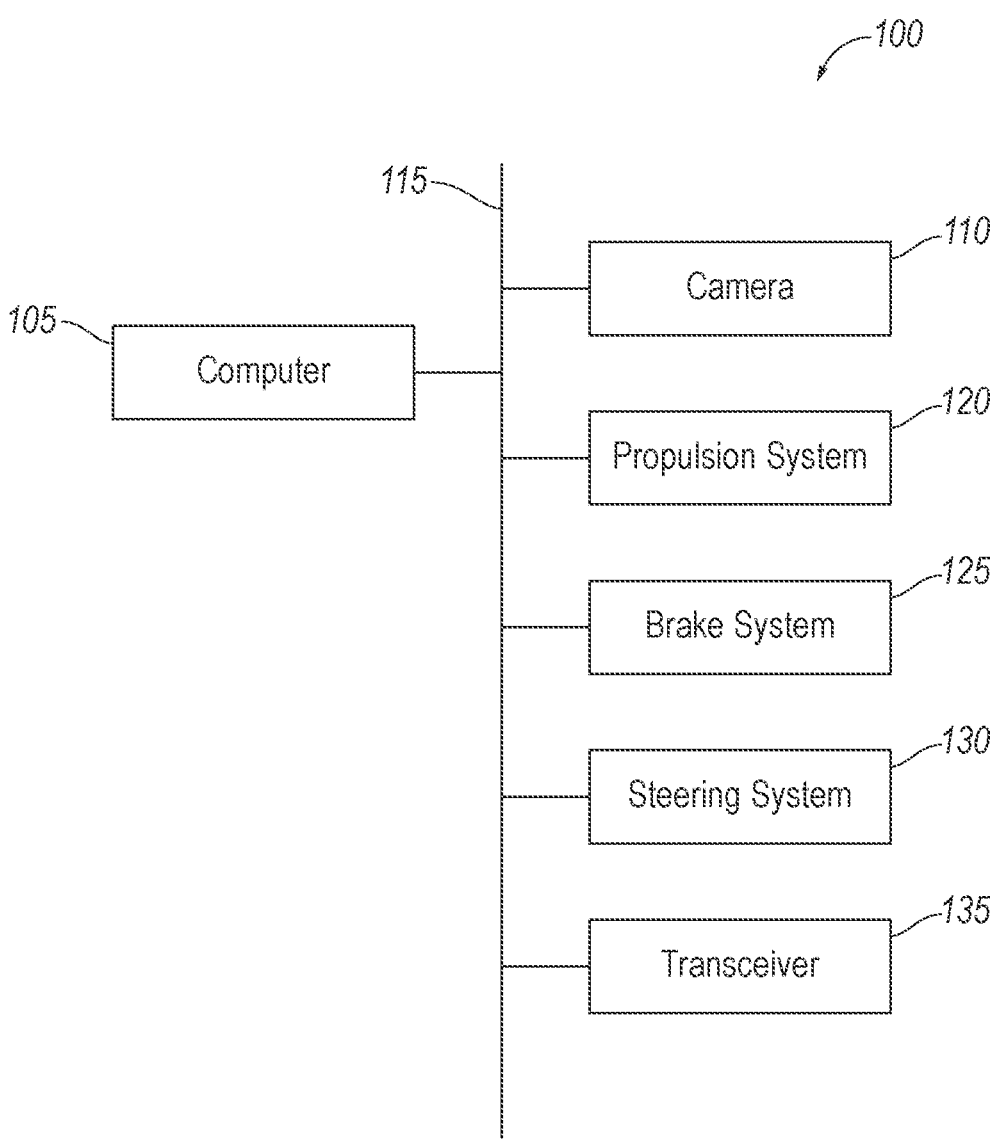
FIG. 1 is a block diagram of an example vehicle including a camera.

Autonomous and semi-autonomous vehicles sometimes use overhead images such as satellite images for navigating a geographic area depicted by the overhead images. This disclosure provides techniques for determining a pose of a camera in the geographic area, e.g., a camera mounted on a vehicle, with respect to an overhead image of the geographic area. The pose may include two spatial coordinates and a heading. The techniques herein can provide a pose with a very high accuracy. The spatial coordinates may locate the camera at down to the specific pixel of the overhead image.

A computer of a vehicle may be programmed to receive or access the overhead image of the geographic area, receive a ground-view image captured by the camera while oriented horizontally, generate an observed overhead feature map from the overhead image, generate a ground-view feature map from the ground-view image, project the ground-view feature map based on a geometric relationship into a projected overhead feature map, and determine a rotation and translation of the camera relative to the overhead image based on the projected overhead feature map and the observed overhead feature map. The rotation and translation define the pose. The use of the geometric relationship can provide a computationally efficient manner for setting up a comparison between the projected overhead feature map (which is based on the ground-view image) and the overhead feature map (which is based on the overhead image). More-over, the pose may be determined using a single ground-view image and a single overhead image.

A computer includes a processor and a memory, and the memory stores instructions executable by the processor to generate an observed overhead feature map from an overhead image of a geographic area; generate a ground-view feature map from a ground-view image captured by a camera within the geographic area, the camera oriented at least partially horizontally while capturing the ground-view image; project the ground-view feature map to an overhead view based on a geometric relationship, resulting in a projected overhead feature map; determine a rotation of the camera relative to the overhead image based on the projected overhead feature map and the observed overhead feature map; and determine a translation of the camera relative to the overhead image based on the projected overhead feature map and the observed overhead feature map.

In an example, the instructions may further include instructions to actuate at least one of a propulsion system, a brake system, or a steering system of a vehicle based on the rotation and translation.

In an example, the instructions may further include instructions to determine a synthesized overhead feature map based on a comparison of the ground-view feature map and the projected overhead feature map. In a further example, the comparison of the ground-view feature map and the projected overhead feature map may include a multi-head cross attention layer. In a still further example, a query of the multi-head cross attention layer may be a function of the projected overhead feature map, and a candidate pool of the multi-head cross attention layer may be a function of the ground-view feature map. In a yet still further example, the candidate pool may include a column of the ground-view feature map paired in the multi-head cross attention layer with a corresponding pixel of the observed overhead feature map included in the query. In a continuing yet still further example, the column may be a first column, and the candidate pool may include at least one neighboring column of the first column paired in the multi-head cross attention layer with the corresponding pixel of the observed overhead feature map included in the query. In a further continuing yet still further example, the at least one neighboring column may include neighboring columns within a preset pixel distance of the first column.

In another yet still further example, the query may be a function of a multi-head self-attention layer of the projected overhead feature map.

In another still further example, the synthesized overhead feature map may be based on a multilayer perceptron of the multi-head cross attention layer.

In another further example, the instructions may further include instructions to determine the rotation based on the synthesized overhead feature map and the observed overhead feature map, and determine the translation based on the synthesized overhead feature map and the observed overhead feature map. In a still further example, the instructions to determine the rotation may include instructions to determine the rotation that minimizes a difference between the synthesized overhead feature map and the observed overhead feature map.

In another still further example, the instructions to determine the rotation may include instructions to execute a neural optimizer on the synthesized overhead feature map and the observed overhead feature map.

In another still further example, the translation may be a second translation, and the instructions to determine the rotation may include instructions to simultaneously determine the rotation and a first translation that minimize a difference between the synthesized overhead feature map and the observed overhead feature map. In a yet still further example, the instructions may further include instructions to output the rotation and the second translation as an estimated pose of the camera.

In another still further example, the instructions to determine the translation may include instructions to determine a spatial correlation between the synthesized overhead feature map and the observed overhead feature map. In a yet still further example, the spatial correlation may be a signal-processing cross-correlation.

In an example, the instructions to determine the translation may include instructions to determine the translation after determining the rotation.

In an example, the rotation and translation may be determined without using ground-view images other than the single ground-view image.

A method includes generating an observed overhead feature map from an overhead image of a geographic area; generating a ground-view feature map from a ground-view image captured by a camera within the geographic area, the camera oriented at least partially horizontally while capturing the ground-view image; projecting the ground-view feature map to an overhead view based on a geometric relationship, resulting in a projected overhead feature map; determining a rotation of the camera relative to the overhead image based on the projected overhead feature map and the observed overhead feature map; and determining a translation of the camera relative to the overhead image based on the projected overhead feature map and the observed overhead feature map.

With reference to the Figures, wherein like numerals indicate like parts throughout the several views, a computer 105 includes a processor and a memory, and the memory stores instructions executable by the processor to generate an observed overhead feature map 215 from an overhead image 205 of a geographic area 300; generate a ground-view feature map 220 from a ground-view image 210 captured by a camera 110 within the geographic area 300, the camera 110 oriented at least partially horizontally while capturing the ground-view image 210; project the ground-view feature map 220 to an overhead view based on a geometric relationship, resulting in a projected overhead feature map 505; determine a rotation of the camera 110 relative to the overhead image 205 based on the projected overhead feature map 505 and the observed overhead feature map 215; and determine a translation of the camera 110 relative to the overhead image 205 based on the projected overhead feature map 505 and the observed overhead feature map 215.

With reference to FIG. 1, a vehicle 100 may be any passenger or commercial automobile such as a car, a truck, a sport utility vehicle, a crossover, a van, a minivan, a taxi, a bus, etc.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through a communications network 115 such as a controller area network (CAN) bus, Ethernet, WiFi, Local Interconnect Network (LIN), onboard diagnostics connector (OBD-II), and/or by any other wired or wireless communications network. The computer 105 may be communicatively coupled to the camera 110, a propulsion system 120, a brake system 125, a steering system 130, a transceiver 135, and other components via the communications network 115.

The camera 110 can detect electromagnetic radiation in some range of wavelengths. For example, the camera 110 may detect visible light, infrared radiation, ultraviolet light, or some range of wavelengths including visible, infrared, and/or ultraviolet light. For example, the camera 110 can be a charge-coupled device (CCD), complementary metal oxide semiconductor (CMOS), or any other suitable type. The camera 110 may be fixed relative to the vehicle 100, e.g., fixedly mounted to a body of the vehicle 100. The camera 110 is oriented at least partially horizontally, e.g., may have a tilt angle and a roll angle relative to the vehicle 100 that are close to zero. For example, a center of a field of view of the camera 110 may be closer to horizontal than to vertical, e.g., may be tilted slightly downward from horizontal.

The propulsion system 120 of the vehicle 100 generates energy and translates the energy into motion of the vehicle 100. The propulsion system 120 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 120 can include an electronic control unit (ECU) or the like that is in communication with and receives input from the computer 105 and/or a human operator. The human operator may control the propulsion system 120 via, e.g., an accelerator pedal and/or a gear-shift lever.

The brake system 125 is typically a conventional vehicle braking subsystem and resists the motion of the vehicle 100 to thereby slow and/or stop the vehicle 100. The brake system 125 may include friction brakes such as disc brakes, drum brakes, band brakes, etc.; regenerative brakes; any other suitable type of brakes; or a combination. The brake system 125 can include an electronic control unit (ECU) or the like that is in communication with and receives input from the computer 105 and/or a human operator. The human operator may control the brake system 125 via, e.g., a brake pedal.

The steering system 130 is typically a conventional vehicle steering subsystem and controls the turning of the wheels. The steering system 130 may be a rack-and-pinion system with electric power-assisted steering, a steer-by-wire system, as both are known, or any other suitable system. The steering system 130 can include an electronic control unit (ECU) or the like that is in communication with and receives input from the computer 105 and/or a human operator. The human operator may control the steering system 130 via, e.g., a steering wheel.

The transceiver 135 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 135 may be adapted to communicate with a remote server, that is, a server distinct and spaced from the vehicle 100. The remote server may be located outside the vehicle 100. For example, the remote server may be associated with another vehicle (e.g., V2V communications), an infrastructure component (e.g., V2I communications), an emergency responder, a mobile device associated with the owner of the vehicle 100, etc. The transceiver 135 may be one device or may include a separate transmitter and receiver.

Figure 2:
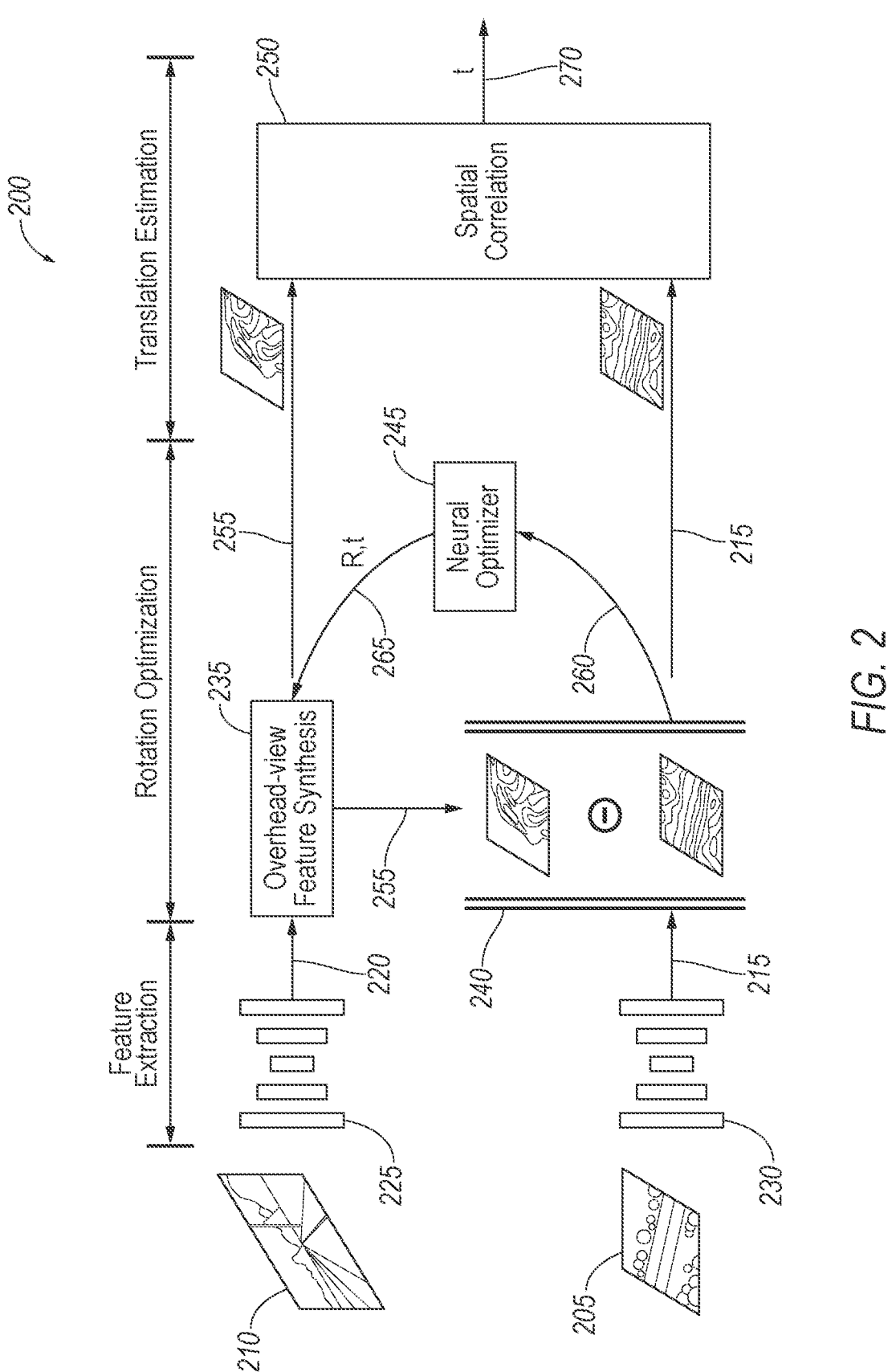
FIG. 2 is a block diagram of an example machine-learning architecture for determining a rotation and translation of the camera relative to an overhead image.

With reference to FIG. 2, the computer 105 may be programmed to determine the pose of the camera 110 (and thereby the pose of the vehicle 100) by executing a machine-learning architecture 200. The outputted pose will be referred to as a second pose 305. The machine-learning architecture 200 may include a first feature extractor 225, a second feature extractor 230, a feature-synthesis block 235, a difference block 240, a neural optimizer 245, and a spatial-correlation block 250, which will be described individually below. As a general overview, the first feature extractor 225 receives the ground-view image 210 and outputs the ground-view feature map 220. The second feature extractor 230 receives the overhead image 205 and outputs the observed overhead feature map 215. The feature-synthesis block 235 receives the ground-view feature map 220 from the first feature extractor 225 and a first pose 265 and outputs a synthesized overhead feature map 255. The difference block 240 receives the observed overhead feature map 215 and the synthesized overhead feature map 255 and outputs an overhead difference 260, which is a difference between the observed overhead feature map 215 and the synthesized overhead feature map 255. The neural optimizer 245 receives the overhead difference 260 and outputs the first pose 265. The first pose 265 includes a rotation and a first translation. The feature-synthesis block 235, the difference block 240, and the neural optimizer 245 may execute iteratively to minimize the overhead difference 260. The spatial-correlation block 250 receives the synthesized overhead feature map 255 according to the rotation output by the neural optimizer 245 after the final iteration and zero translation, the observed overhead feature map 215, and the spatial-correlation block 250 outputs a second translation 270. The machine-learning architecture 200 outputs the rotation from the neural optimizer 245 updated at the final iteration and the second translation 270 as the second pose 305 of the camera 110. The rotation updated at the final iteration and second translation 270 are determined without using ground-view images other than the single ground-view image 210 and without using overhead images other than the single overhead image 205, i.e., without using multiple ground-view images or multiple overhead images.

Figure 3:
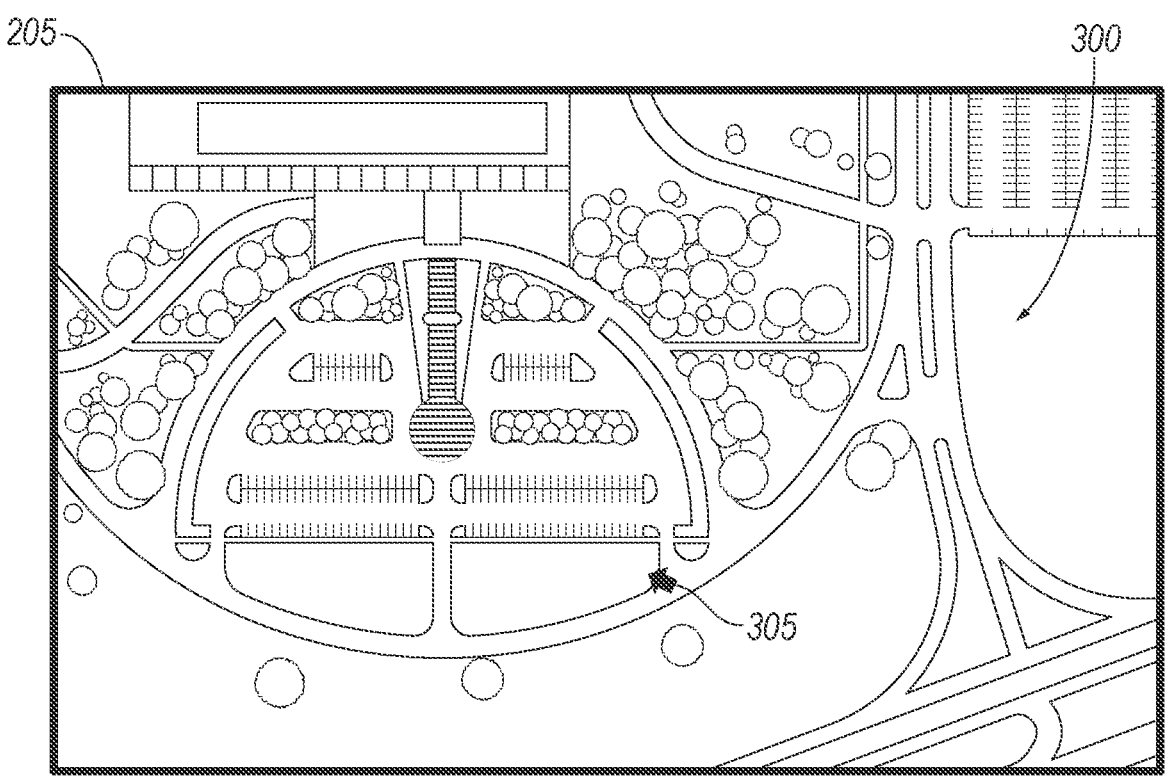
FIG. 3 is an example overhead image of a geographic area.

FIG. 3 is a representation of the overhead image 205. The overhead image 205 is an image of the geographic area 300 obtained by a sensor external to the vehicle 100, e.g., a camera above the ground. The sensor is unattached to the vehicle 100 and spaced from the vehicle 100. To capture the overhead image 205 of the geographic area 300, the sensor, e.g., camera, may be mounted to a satellite, aircraft, helicopter, unmanned aerial vehicles (or drones), balloon, stand-alone pole, a ceiling of a building, etc. In particular, the overhead image 205 may be a satellite image, i.e., an image captured from a sensor on board a satellite.

The overhead image 205 is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in the overhead image 205, i.e., position in the field of view of the sensor at the time that the image frame was recorded, can be specified in pixel dimensions or coordinates, e.g., an ordered pair of pixel distances, such as a number of pixels from a top edge and a number of pixels from a left edge of the overhead image 205.

The computer 105 is programmed to receive the overhead image 205 of the geographic area 300. For example, the computer 105 may receive the overhead image 205 via the transceiver 135 from a remote server. For another example, the overhead image 205 may be stored in the memory of the computer 105, and the computer 105 may receive the overhead image 205 from the memory. The computer 105 may request the overhead image 205 from the remote server or from memory based on a location of the vehicle 100, e.g., from a global positioning system (GPS) sensor, in order that the overhead image 205 covers the geographic area 300 through which the vehicle 100 is traveling. The location of the vehicle 100 may be less accurate than the second translation determined below.

The computer 105 is programmed to generate the observed overhead feature map 215 from the overhead image 205. Generating the observed overhead feature map 215 includes executing the second feature extractor 230. The second feature extractor 230 may include one or more suitable techniques for feature extraction, e.g., low-level techniques such as edge detection, corner detection, blob detection, ridge detection, scale-invariant feature transform (SIFT), etc.; shape-based techniques such as thresholding, blob extraction, template matching, Hough transform, generalized Hough transform, etc.; flexible methods such as deformable parameterized shapes, active contours, etc.; etc. The second feature extractor 230 may include machine-learning operations. For example, the second feature extractor 230 may include residual network (ResNet) layers followed by a convolutional neural network.

The observed overhead feature map 215 includes a plurality of features. For the purposes of this disclosure, the term "feature" is used in its computer-vision sense as a piece of information about the content of an image, specifically about whether a certain region of the image has certain properties. Types of features may include edges, corners, blobs, etc. The observed overhead feature map 215 provides locations in the overhead image 205, e.g., in pixel coordinates, of the features. The observed overhead feature map 215 has a same or reduced dimensionality compared to the overhead image 205. The observed overhead feature map 215 may be a feature pyramid, i.e., include a plurality of individual feature maps of different dimensionalities, i.e., levels, e.g., different downscaling factors from the overhead image 205.

Figure 4:
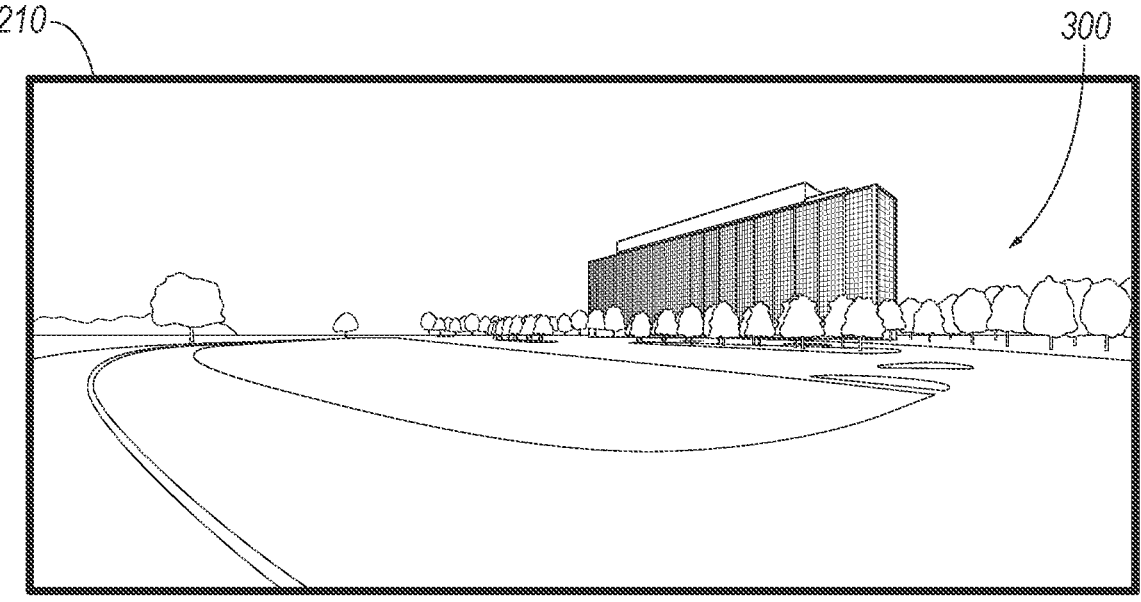
FIG. 4 is an example ground-view image captured by the camera within the geographic area.

FIG. 4 is a representation of the ground-view image 210. The computer 105 is programmed to receive the ground-view image 210, e.g., from the camera 110 over the communications network 115. The ground-view image 210 is captured by the camera 110 within the geographic area 300, i.e., within the area represented in the overhead image 205. The camera 110 is oriented at least partially horizontally while capturing the ground-view image 210, e.g., by being fixed to the vehicle 100 in a partially horizontal orientation.

The computer 105 is programmed to generate the ground-view feature map 220 from the ground-view image 210. Generating the ground-view feature map 220 includes executing the first feature extractor 225. The first feature extractor 225 may include one or more suitable techniques for feature extraction, e.g., low-level techniques such as edge detection, corner detection, blob detection, ridge detection, scale-invariant feature transform (SIFT), etc.; shape-based techniques such as thresholding, blob extraction, template matching, Hough transform, generalized Hough transform, etc.; flexible methods such as deformable parameterized shapes, active contours, etc.; etc. The first feature extractor 225 may include machine-learning operations. For example, the first feature extractor 225 may include residual network (ResNet) layers followed by a convolutional neural network.

The ground-view feature map 220 includes a plurality of features. The ground-view feature map 220 provides locations in the ground-view image 210, e.g., in pixel coordinates, of the features. The ground-view feature map 220 has a reduced dimensionality compared to the ground-view image 210. The ground-view feature map 220 may be a feature pyramid.

Figure 5:
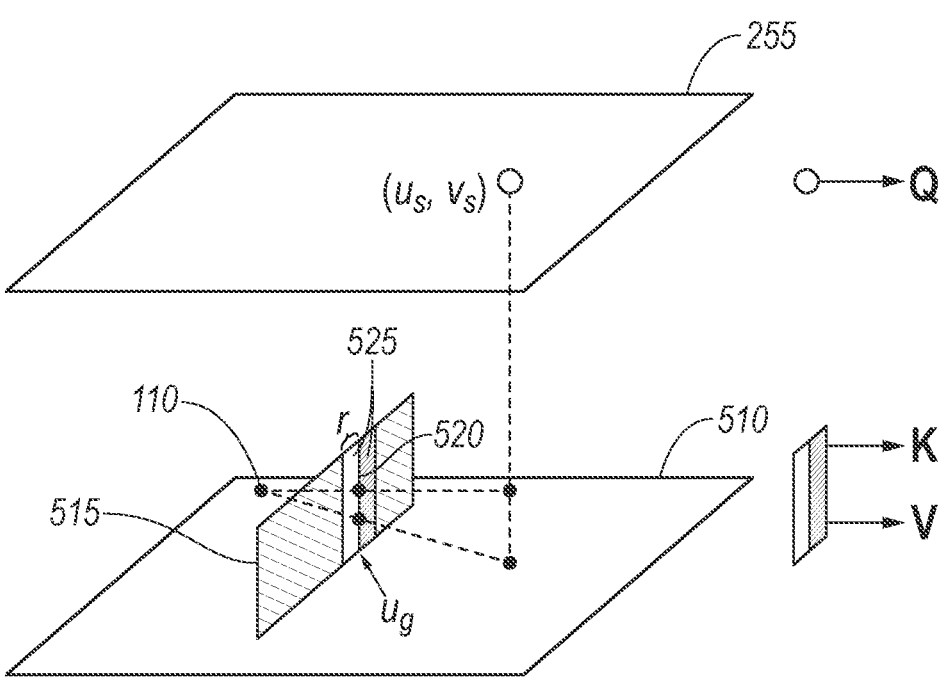
FIG. 5 is a diagram of an example geometric projection from a ground-view feature map to an observed overhead feature map.

With reference to FIG. 5, the computer 105 is programmed to project the ground-view feature map 220 to an overhead view based on a geometric relationship, resulting in the projected overhead feature map 505. For example, the geometric relationship may be a homography between a ground plane 510 and an image plane 515 of the camera 110. The term "homography" is used in the projective geometry sense of an isomorphism between projective spaces, in this case the projective space of the ground plane 510 and the projective space of the image plane 515 of the camera 110.

Figure 6:
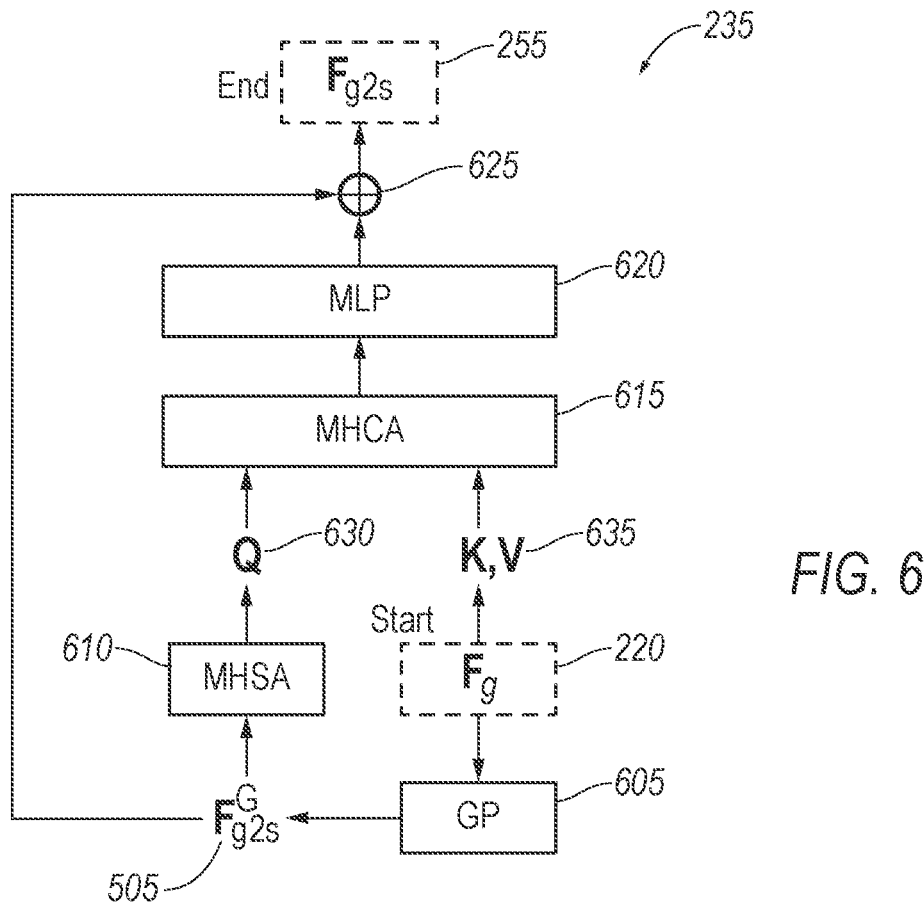
FIG. 6 is a block diagram of an example feature-synthesis block of the machine-learning architecture for generating a synthesized overhead feature map.

With reference to FIG. 6, the computer 105 is programmed to determine the synthesized overhead feature map 255 based on a comparison of the ground-view feature map 220 and the projected overhead feature map 505. Determining the synthesized overhead feature map 255 includes executing the feature-synthesis block 235. As an overview, the feature-synthesis block 235 includes a geometric projection block 605, a multi-head self-attention layer (MHSA) 610, a multi-head cross-attention layer (MHCA) 615, a multilayer perceptron (MLP) 620, and a summation block 625. The geometric projection block 605 receives the ground-view feature map 220 and outputs the projected overhead feature map 505, as just described. The MHSA 610 receives the projected overhead feature map 505 and outputs a query 630 to the MHCA 615. The MHCA 615 receives the query 630 and a candidate pool 635 drawn from the ground-view feature map 220. The comparison may be performed by the MHCA 615 between the query 630 from the projected overhead feature map 505 and the candidate pool 635 from the ground-view feature map 220. The MHCA 615 outputs to the MLP 620. The synthesized overhead feature map 255 is a sum of the output from the MLP 620 and the projected overhead feature map 505, represented by the summation block 625.

The MHSA 610 is a multi-head self-attention layer of the projected overhead feature map 505. In other words, the MHSA 610 receives the projected overhead feature map 505 as an input. The MHSA 610 applies an attention mechanism multiple times in parallel to the input, i.e., the projected overhead feature map 505. Colloquially, the MHSA 610 makes the elements of the projected overhead feature map 505 aware of other contextual information from the projected overhead feature map 505. A function of the MHSA 610 is used as the query 630 to the MHCA 615.

The MHCA 615 is part of the comparison of the ground-view feature map 220 and the projected overhead feature map 505. The MHCA 615 is a multi-head cross-attention layer taking a function of the projected overhead feature map 505 as the query 630 and taking a function of the ground-view feature map 220 as the candidate pool 635. The candidate pool 635 serves as the key and value for the MHCA 615. The MHCA 615 applies an attention mechanism between the query 630 and the candidate pool 635 multiple times in parallel. Colloquially, the MHCA 615 collects information from the ground-view feature map 220 to update the projected overhead feature map 505.

Returning to FIG. 5, portions of the query 630 and the candidate pool 635 are paired up for comparison within the MHCA 615. The candidate pool 635 includes a first column 520 of the ground-view feature map 220 paired in the MHCA 615 with a corresponding pixel to be generated of the synthesized overhead feature map 255, which is included in the query 630. The first column 520 is identified by a horizontal pixel coordinate $u_g$. When the tilt and roll angles of the camera 110 are zero, the pairing of the pixel of the synthesized overhead feature map 255 and the pixel of the ground feature map 220 is defined by the following geometric relationship:

$$\begin{bmatrix} u_g \\ v_g \end{bmatrix} = \begin{bmatrix} f_x \dfrac{\left(\left(v_s - v_s^0\right) + t_x\right)\cos\theta - \left(\left(u_s - u_s^0\right) + t_z\right)\sin\theta}{\left(\left(v_s - v_s^0\right) + t_x\right)\sin\theta + \left(\left(u_s - u_s^0\right) + t_z\right)\cos\theta} + u_g^0 \\ f_y \dfrac{h}{\alpha\left(\left(\left(v_s - v_s^0\right) + t_x\right)\sin\theta + \left(\left(u_s - u_s^0\right) + t_z\right)\cos\theta\right)} + v_g^0 \end{bmatrix}$$

in which $(u_g, v_g)$ is a pixel coordinate in the ground-view feature map 220, $$\left(u_g^0, v_g^0\right)$$

is the pixel coordinate of the center of the ground-view feature map 220, $(u_s, v_s)$ is a corresponding pixel coordinate of the synthesized overhead feature map 255, $$\left(u_s^0, v_s^0\right)$$

is the pixel coordinate of the center of the synthesized overhead feature map 255, $f_x$ and $f_y$ are the components of the focal length f of the camera 110 along the u and v directions, h is the height of the pixel $(u_s, v_s)$ above the ground plane 510, $\alpha$ is the ground resolution of the synthesized overhead feature map 255 (as well as of the observed overhead feature map 215), $(t_x, t_y)$ is the translation between the location of the camera 110 and the center $$\left(u_s^0, v_s^0\right)$$

of the synthesized overhead feature map 255, and θ is the azimuth angle of the camera 110, i.e., the rotation. Although the height h is not known, the MHCA 615 does not need the height h by instead just calculating the horizontal pixel coordinate $u_g$ and using entire columns of the ground-view feature map 220; i.e., the horizontal pixel coordinate $u_g$ identifies the first column 520. While iterating the feature-synthesis block 235, the difference block 240, and the neural optimizer 245, the translation $(t_x, t_y)$ and the rotation θ may be received from the neural optimizer 245. The values for the translation $(t_x, t_y)$ and the rotation θ may be initialized to arbitrary values or based on location data from, e.g., the GPS sensor.

The candidate pool 635 corresponding to a given pixel $(u_s, v_s)$ of the synthesized overhead feature map 255 may also include at least one neighboring column 525 of the first column 520, e.g., a set of the neighboring columns 525 within a preset pixel distance r to the first column 520 in the ground-view feature map 220, i.e., columns with horizontal pixel coordinates $[u_g-r, u_g+r]$. The use of neighboring columns 525 compensates for possible tilt and yaw of the camera 110, and the preset pixel distance r may be chosen to compensate for typical ranges of tilt and yaw of the camera 110.

The MHCA 615 may be a product of a softmax of (1) a product of the query 630 and a key and (2) a value, as given in the following equation:

$$MHCA(F_{g2s}^G, F_g) = Softmax(QK^T)V$$

in which $$F_{g2s}^G$$

is the projected overhead feature map 505, $F_g$ is the ground-view feature map 220, Q is the query 630, K is the key, V is the value, and the superscript T is the transpose operation. A softmax is a mathematical function that converts a vector of numbers into a vector of probabilities, the probabilities being proportional to the relative scale of each value of the vector. The query 630 may be a function of the MHSA 610 of the projected overhead feature map 505. The key and the value may be functions of the ground-view feature map 220. For example, the functions may all be linear layers, as in the following equations:

$$Q = \mathcal{Q}(MHSA(F_{g2s}^G))$$
$$K = \mathcal{K}(F_g)$$
$$V = \mathcal{V}(F_g)$$

in which $\mathcal{Q}$, $\mathcal{K}$, and $\mathcal{V}$ represent linear layers.

The synthesized overhead feature map 255 may be based on a multilayer perceptron of the multi-head cross attention layer. The MLP 620 is a feedforward artificial neural network (ANN) that is fully connected. The synthesized overhead feature map 255 may also be based on a skip connection of the projected overhead feature map 505 to the MLP 620, represented in FIG. 6 by the summation block 625 receiving the synthesized overhead feature map 255, as given in the following equation:

$$F_{g2s} = F_{g2s}^G + M(MHCA(F_{g2s}^G, F_g))$$

in which $F_{g2s}$ is the synthesized overhead feature map 255 and M is the MLP 620.

Figure 7:
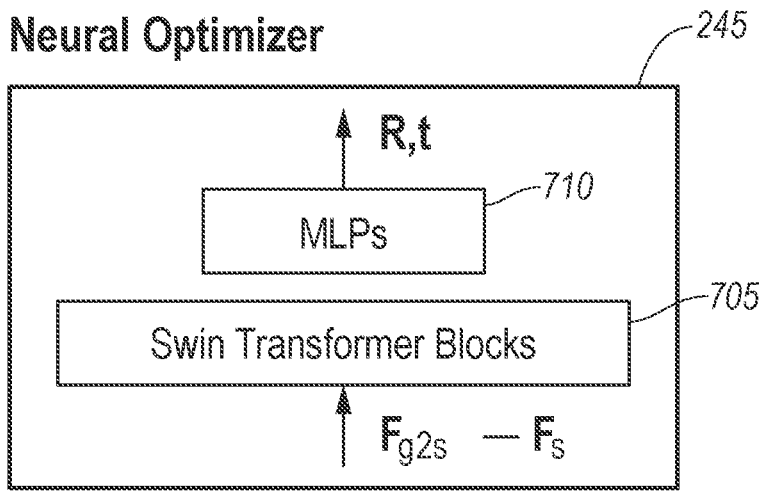
FIG. 7 is a block diagram of an example neural optimizer of the machine-learning architecture for determining the rotation of the camera.

With reference to FIG. 7, the computer 105 is programmed to determine a rotation, e.g., the first pose 265 including the rotation, of the camera 110 relative to the overhead image 205 based on the synthesized overhead feature map 255 (and thereby based on the projected overhead feature map 505 as just described) and based on the observed overhead feature map 215. The first pose 265 includes the rotation and a first translation, which may be determined simultaneously. The computer 105 may determine the rotation, e.g., the first pose 265, that minimizes a difference between the synthesized overhead feature map 255 and the observed overhead feature map 215, as given in the following expression:

$$\min_{R, t_1} \|F_{g2s} - F_s\|_2^2$$

in which R is the rotation, $t_1$ is the first translation, and $F_s$ is the observed overhead feature map 215. The difference between the synthesized overhead feature map 255 and the observed overhead feature map 215 is referred to as the overhead difference 260 and is provided by the difference block 240, as shown in FIG. 2.

Determining the rotation may include executing the neural optimizer 245 on the synthesized overhead feature map 255 and the observed overhead feature map 215. The neural optimizer 245 may include at least one swin transformer block 705 and at least one MLP 710, e.g., two swin transformer blocks 705 and two MLPs 710. The swin transformer blocks 705 are useful for global feature embedding, which the inventors have determined is more important than local information for determining the rotation. The neural optimizer 245 receives the overhead difference 260 between the synthesized overhead feature map 255 and the observed overhead feature map 215 as input, and the neural optimizer 245 outputs the first pose 265 to the feature-synthesis block 235 each iteration. Although the first translation from the first pose 265 will not be used below, updating the first pose 265 each iteration allows a high rotation estimation accuracy. The neural optimizer 245 may progress through the iterations from coarser feature levels of the feature maps (i.e., greater downscaling) to finer feature levels of the feature maps (i.e., less downscaling), which permits fine-tuning around potential minimums while helping prevent converging on local minimums.

Figure 8:
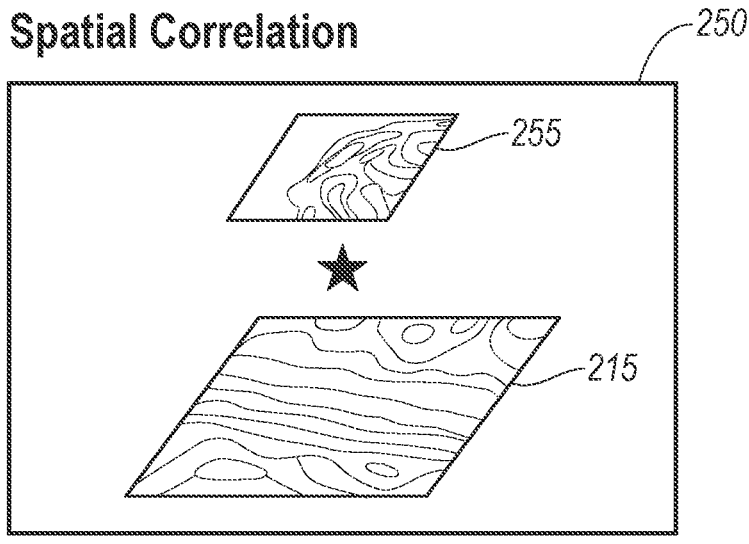
FIG. 8 is a block diagram of an example spatial-correlation block of the machine-learning architecture for determining the translation of the camera.

With reference to FIG. 8, the computer 105 is programmed to determine the second translation 270 of the camera 110 relative to the overhead image 205 based on the synthesized overhead feature map 255 (and thereby based on the projected overhead feature map 505 as described above) and based on the observed overhead feature map 215. The computer 105 determines the second translation 270 after determining the rotation, i.e., after iterating the neural optimizer 245 to convergence on the first pose 265. The rotation may be used for determining the second translation 270.

Determining the second translation 270 may include determining a spatial correlation between the synthesized overhead feature map 255 and the observed overhead feature map 215 by executing the spatial-correlation block 250. The spatial correlation may serve as a dense search for the second translation 270, i.e., a search at each pixel of the overhead image 205. For example, the spatial correlation may be a signal-processing cross-correlation, as given in the following equation:

$$P = (F_s \star F_{g2s})(u_s, v_s)$$

in which P is a matrix or vector of the probabilities of the translation being to each pixel in the overhead image 205 and the star operator (*) is the cross-correlation operator. A cross-correlation in signal processing is a measure of similarity between two series as a function of the displacement of one series relative to the other. In this case, the displacement is the second translation 270, and the two series are the synthesized overhead feature map 255 and the observed overhead feature map 215. The cross-correlation may be calculated as a sliding dot product or sliding inner-product. The pixel of the overhead image 205 with the highest probability in P is taken as the second translation 270. The matrix or vector P is a probability map of the location of the camera 110 corresponding to pixels in the overhead image 205.

The computer 105 is programmed to output the second pose 305, i.e., the rotation from the first pose 265 and the second translation 270, as an estimated pose of the camera 110. As noted above, the first translation from the first pose 265 is not used as part of an estimated pose of the vehicle 100. The first translation from the first pose 265 may be discarded after determining the first pose 265, i.e., the loop of the neural optimizer 245 is finished. The computer 105 may also output the matrix or vector P as a probability map of the possible locations of the camera 110.

The machine-learning architecture 200 is trained to closely match the outputted second pose 305 with an actual pose of the camera 110 by training on training data. The training data may include a plurality of overhead images paired with respective ground-view images, as well as known poses of the camera 110 for the respective pairs of images, i.e., ground-truth poses. The machine-learning architecture 200 is trained to match the outputted second pose 305 with the respective known pose.

The machine-learning architecture 200 is trained by minimizing a loss function. The loss function may be a combination of a first loss applied to the first pose 265 and a second loss applied to the second translation 270, i.e., the output of the neural optimizer 245 and the output of the spatial-correlation block 250, respectively. For example, the loss function may be a sum of a term involving the first loss and a term involving the second loss, e.g., as in the following equation:

$$L = L_1 e^{-\lambda_1} + \lambda_1 + L_2 e^{-\lambda_2} + \lambda_2$$

in which L is the loss function, $L_1$ is the first loss, $L_2$ is the second loss, and $\lambda_1$ and $\lambda_2$ are coefficients that are dynamically adjusted during training based on the magnitudes of the loss terms. The first loss may be based on a difference between the first pose 265 and a ground-truth pose, e.g., a sum of differences between the respective terms of the first poses 265 and the respective ground-truth poses, as in the following equation:

$$L_1 = \sum_n \sum_l (\|\theta_n^l - \theta^*\|_1 + \|t_{x,n}^l - t_x^*\|_1 + \|t_{z,n}^l - t_z^*\|_1)$$

in which the superscript l is an index of a feature map level for the first pose 265, i.e., a downscaling factor; the subscript n is an index of the number of iterations for the first pose 265; and the asterisk (*) indicates a term of the ground-truth pose. The second loss may be a triplet loss. In a machine-learning sense, a triplet loss is when a reference input or "anchor" is compared to both a matching input and a nonmatching input to minimize the distance to the matching input and maximize the distance to the nonmatching input. For this disclosure, the triplet loss serves to maximize the reported probability at a ground-truth translation and minimize the reported probability at other translations, as in the following equation:

$$L_2 = \frac{1}{N} \sum_{u_s} \sum_{v_s} \log(1 + \exp(\gamma(P(u_s^*, v_s^*) - P(u_s, v_s))))$$

in which $$(u_s^*, v_s^*)$$

is the ground-truth pixel at which the camera 110 is located, $(u_s, v_s)$ are the pixels that are not the ground-truth pixel, N is the total number of pixels, and $\gamma$ is a tunable coefficient.

Figure 9:
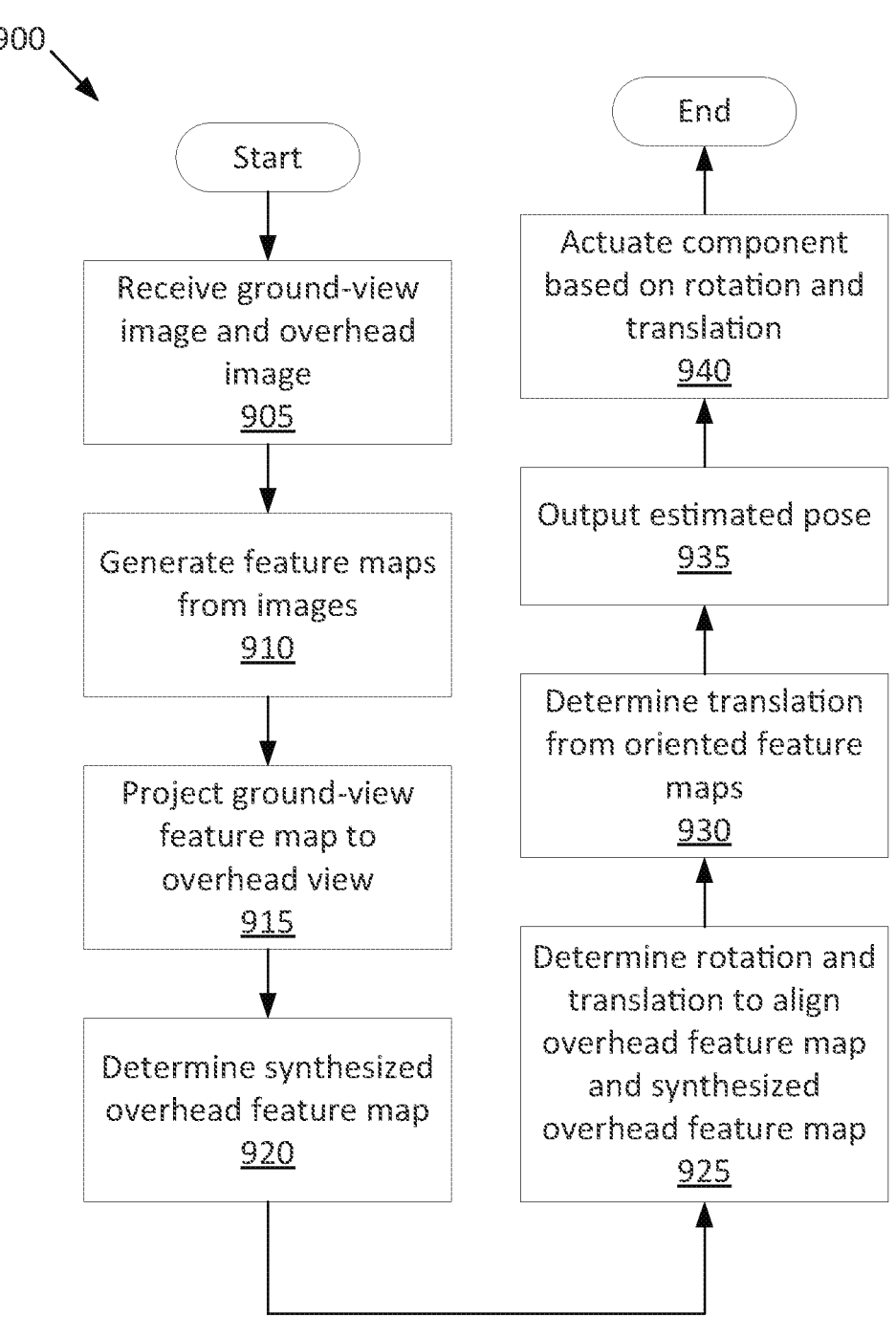
FIG. 9 is a flowchart of an example process for determining the rotation and translation of the camera relative to the overhead image.

FIG. 9 is a flowchart illustrating an example process 900 for determining the second pose 305. The memory of the computer 105 stores executable instructions for performing the steps of the process 900 and/or programming can be implemented in structures such as mentioned above. As a general overview of the process 900, the computer 105 receives the ground-view image 210 and the overhead image 205, generates the ground-view feature map 220 and the observed overhead feature map 215, projects the ground-view feature map 220 to determine the projected overhead feature map 505, determines the synthesized overhead feature map 255, determines the first pose 265, determines second translation 270, outputs the second pose 305, and actuates a component of the vehicle 100 based on the second pose 305.

The process 900 begins in a block 905, in which the computer 105 receives the overhead image 205 of the geographic area 300 and the ground-view image 210 captured by the camera 110 within the geographic area 300, as described above.

Next, in a block 910, the computer 105 generates the observed overhead feature map 215 from the overhead image 205 and generates the ground-view feature map 220 from the ground-view image 210, as described above.

Next, in a block 915, the computer 105 projects the ground-view feature map 220 to an overhead view based on the geometric relationship, resulting in the projected overhead feature map 505, as described above.

Next, in a block 920, the computer 105 determines the synthesized overhead feature map 255 based on a comparison of the ground-view feature map 220 and the projected overhead feature map 505, as described above.

Next, in a block 925, the computer 105 determines the rotation of the camera 110 relative to the overhead image 205, e.g., the first pose 265, based on the synthesized overhead feature map 255 and the observed overhead feature map 215, as described above.

Next, in a block 930, the computer 105 determines the second translation 270 of the camera 110 relative to the overhead image 205 based on the synthesized overhead feature map 255 and the observed overhead feature map 215, as described above.

Next, in a block 935, the computer 105 outputs the rotation from the first pose 265 and the second translation 270, i.e., the second pose 305, as an estimated pose of the camera 110, as described above.

Next, in a block 940, the computer 105 actuates a component of the vehicle 100 based on the rotation from the first pose 265 and the second translation 270 of the camera 110. The computer 105 may determine an estimated pose of the vehicle 100 based on the second pose 305 of the camera 110 according to a known, fixed geometric relationship between the camera 110 and a reference point of the vehicle 100. The component may include, e.g., the propulsion system 120, the brake system 125, and/or the steering system 130. For example, the computer 105 may actuate at least one of the propulsion system 120, the brake system 125, or the steering system 130. For example, the computer 105 may actuate the steering system 130 based on the distances to lane boundaries as part of a lane-centering feature, e.g., steering to prevent the vehicle 100 from traveling too close to the lane boundaries. The computer 105 may identify the lane boundaries using the overhead image 205 and/or sensors of the vehicle 100 such as the camera 110. The computer 105 may, if the location of the vehicle 100 is within a distance threshold of one of the lane boundaries, instruct the steering system 130 to actuate to steer the vehicle 100 toward the center of the lane. For another example, the computer 105 may operate the vehicle 100 autonomously, i.e., actuating the propulsion system 120, the brake system 125, and the steering system 130 based on the second pose 305, e.g., to navigate the vehicle 100 through the geographic area 300. After the block 940, the process 900 ends.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:

generate an observed overhead feature map from an overhead image of a geographic area;

generate a ground-view feature map from a ground-view image captured by a camera within the geographic area, the camera oriented at least partially horizontally while capturing the ground-view image;

project the ground-view feature map to an overhead view based on a geometric relationship, resulting in a projected overhead feature map;

determine a synthesized overhead feature map based on a comparison of the ground-view feature map and the projected overhead feature map, wherein the comparison of the ground-view feature map and the projected overhead feature map includes a multi-head cross attention layer;

determine a rotation of the camera relative to the overhead image based on the projected overhead feature map and the observed overhead feature map; and determine a translation of the camera relative to the overhead image based on the projected overhead feature map and the observed overhead feature map.

2. The computer of claim 1, wherein the instructions further include instructions to actuate at least one of a propulsion system, a brake system, or a steering system of a vehicle based on the rotation and translation.

3. The computer of claim 1, wherein a query of the multi-head cross attention layer is a function of the projected overhead feature map, and a candidate pool of the multi-head cross attention layer is a function of the ground-view feature map.

4. The computer of claim 3, wherein the candidate pool includes a column of the ground-view feature map paired in the multi-head cross attention layer with a corresponding pixel of the observed overhead feature map included in the query.

5. The computer of claim 4, wherein the column is a first column, and the candidate pool includes at least one neighboring column of the first column paired in the multi-head cross attention layer with the corresponding pixel of the observed overhead feature map included in the query.

6. The computer of claim 5, wherein the at least one neighboring column includes neighboring columns within a preset pixel distance of the first column.

7. The computer of claim 3, wherein the query is a function of a multi-head self-attention layer of the projected overhead feature map.

8. The computer of claim 1, wherein the synthesized overhead feature map is based on a multilayer perceptron of the multi-head cross attention layer.

9. The computer of claim 1, wherein the instructions further include instructions to determine the rotation based on the synthesized overhead feature map and the observed overhead feature map, and determine the translation based on the synthesized overhead feature map and the observed overhead feature map.

10. The computer of claim 9, wherein the instructions to determine the rotation include instructions to determine the rotation that minimizes a difference between the synthesized overhead feature map and the observed overhead feature map.

11. The computer of claim 9, wherein the instructions to determine the rotation include instructions to execute a neural optimizer on the synthesized overhead feature map and the observed overhead feature map.

12. The computer of claim 9, wherein the translation is a second translation, and the instructions to determine the rotation include instructions to simultaneously determine the rotation and a first translation that minimize a difference between the synthesized overhead feature map and the observed overhead feature map.

13. The computer of claim 12, wherein the instructions further include instructions to output the rotation and the second translation as an estimated pose of the camera.

14. The computer of claim 9, wherein the instructions to determine the translation include instructions to determine a spatial correlation between the synthesized overhead feature map and the observed overhead feature map.

15. The computer of claim 14, wherein the spatial correlation is a signal-processing cross-correlation.

16. The computer of claim 1, wherein the instructions to determine the translation include instructions to determine the translation after determining the rotation.

17. The computer of claim 1, wherein the rotation and translation are determined without using ground-view images other than the single ground-view image.

18. A method comprising:

generating an observed overhead feature map from an overhead image of a geographic area;

generating a ground-view feature map from a ground-view image captured by a camera within the geographic area, the camera oriented at least partially horizontally while capturing the ground-view image;

projecting the ground-view feature map to an overhead view based on a geometric relationship, resulting in a projected overhead feature map;

determine a synthesized overhead feature map based on a comparison of the ground-view feature map and the projected overhead feature map, wherein the comparison of the ground-view feature map and the projected overhead feature map includes a multi-head cross attention layer;

determining a rotation of the camera relative to the overhead image based on the projected overhead feature map and the observed overhead feature map; and determining a translation of the camera relative to the overhead image based on the projected overhead feature map and the observed overhead feature map.

19. The method of claim 18, wherein a query of the multi-head cross attention layer is a function of the projected overhead feature map, and a candidate pool of the multi-head cross attention layer is a function of the ground-view feature map.

20. The method of claim 18, further comprising determining the rotation based on the synthesized overhead feature map and the observed overhead feature map, and determining the translation based on the synthesized overhead feature map and the observed overhead feature map.

\* \* \* \* \*